MAGNETIC RECORDING AND PLAYBACK APPARATUS

Filed Sept. 15, 1965

INVENTOR.
CHARLES F. ROSE
BY Eugene M. Whitacre
Attorney

INVENTOR.
CHARLES F. ROSE
BY Eugene M. Whitacre
Attorney

3,371,881
MAGNETIC RECORDING AND PLAYBACK APPARATUS

Charles F. Rose, Indianapolis, Ind., assignor to Radio Corporation of America, a corporation of Delaware Filed Sept. 15, 1965, Ser. No. 487,534
12 Claims. (Cl. 242—55.12)

ABSTRACT OF THE DISCLOSURE

A fast forward mechanism for magnetic recording and playback apparatus includes a linkage provided to vary the bias between a clutch plate and drive pulley for the tape reel to control the rate of rotation of the reel.

This invention relates to drive system for the takeup reels of magnetic recording and/or playback apparatus, such as one wherein a magnetic tape is advanced past a recording or reproducing magnetic head by a constant speed drive device, the tape being stripped from a supply reel for feed to the head, and wound on a take-up reel after passing the head.

In prior art drive systems it has become common practice to provide a mechanism for advancing the record tape past a recording and/or playback head at a rate that is maintained constant during recording or playback by a capstan drive, and for takeup of the tape by a reel driven from the same constant speed motor that powers the capstan drive. In such prior art arrangements the surface speed of the progressively enlarged take-up reel coil has been maintained in correspondence to the constant travel rate of the record tape by driving the take-up reel support or turntable through a friction slip clutch from a drive pulley rotating at a constant speed sufficiently high to maintain the record tape taut at the minimum diameter of the take-up coil. The amount of torque that is transferred from the drive pulley is limited by the slip being provided between the driving and driven friction clutch elements to accommodate the take-up reel speed to a coil surface speed matching the tape record speed.

For high speed advance of the record tape, it has been the practice in the prior art to provide means to positively couple the take-up reel turntable to the drive pulley and provide a fixed torque drive between take-up reel turntable and drive pulley sufficient for high speed advance of the record tape. In a recorder-playback apparatus operable with supply and take-up reels housed in a closed cartridge the driving torque required to advance the record tape from supply to take-up reel at a constant high speed varies as a function of the quality of the tape winding, i.e., the evenness of the spirally wound layers of tape. During reeling operations the tape may rub against the surfaces of the top and bottom walls of the cartridge causing a slight bind due to an uneven distribution of the layers of tape on the reels. When a smoothly wound tape cartridge is wound through a fast forward mode of operation, a low torque is sufficient. As the winding of the tape becomes more uneven, more and more torque is required. The worst condition can be anticipated and a fixed torque of sufficient magnitude to provide fast forward reeling can be applied to the drive pulley. However, since the bearing losses between the clutch mechanism and take-up reel turntable increase with an increase in the normal force required to produce this torque, when a smoothly wound tape cartridge is advanced through a fast forward mode of operation, more torque than is necessary is supplied from the drive pulley, thus resulting in an unnecessary loading of the clutch and turntable bearings.

To facilitate the finding of specific passages on the tape during fast forward reeling (hunting) it would be desirable for an operator to be able to control the torque coupled from the drive pulley to the take-up reel so as to vary the speed of the fast forward reeling.

An object of the present invention is to provide an improved apparatus for transporting a magnetic record tape, film or other reeling medium.

A further object of the present invention is to provide an improved mechanism for controlling the speed at which a reelable member is driven in a transport apparatus of a magnetic tape recorder.

A system embodying the present invention includes a variable torque clutch mechanism for driving the take-up spindle and reel support turntable during fast forward operation of a record-playback tape transport, as well as for normal record and/or playback operation. The clutch mechanism includes a felt pad mounted on a clutch plate. A first flat spring attached to a spindle which rotates the take-up reel biases the clutch plate against a drive pulley which is driven from a constant speed motor. The bias provided by the first spring controls the amount of slippage in the clutch mechanism so that a predetermined amount of torque is coupled to the take-up spindle and reel support turntable from the drive pulley during record-playback operation of the tape transport. A controllable second flat spring provides an additional variable bias between the clutch plate and drive pulley. The bias provided by the second spring is manually controlled through a suitable linkage movable from a first position to a limit position to continuously increase the torque transferred from the drive pulley to the take-up reel from said predetermined amount of torque by applying pressure against the second flat spring and thereby provide a variable speed fast-forward control function. Using the above mentioned linkage, an operator, by pulling on a lever, can adjust the torque coupling to the take-up spindle to provide a high forward reeling speed when forward winding a reel of tape, and a slow reeling speed when "hunting" or seeking specific passages on the tape.

A further feature of the invention is the provision for automatic braking of the tape supply spindle drive pulley and the deenergization of the take-up pulley drive motor when the operator releases the lever to stop the fast forward reeling of the tape.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawing in which:

Figure 1:
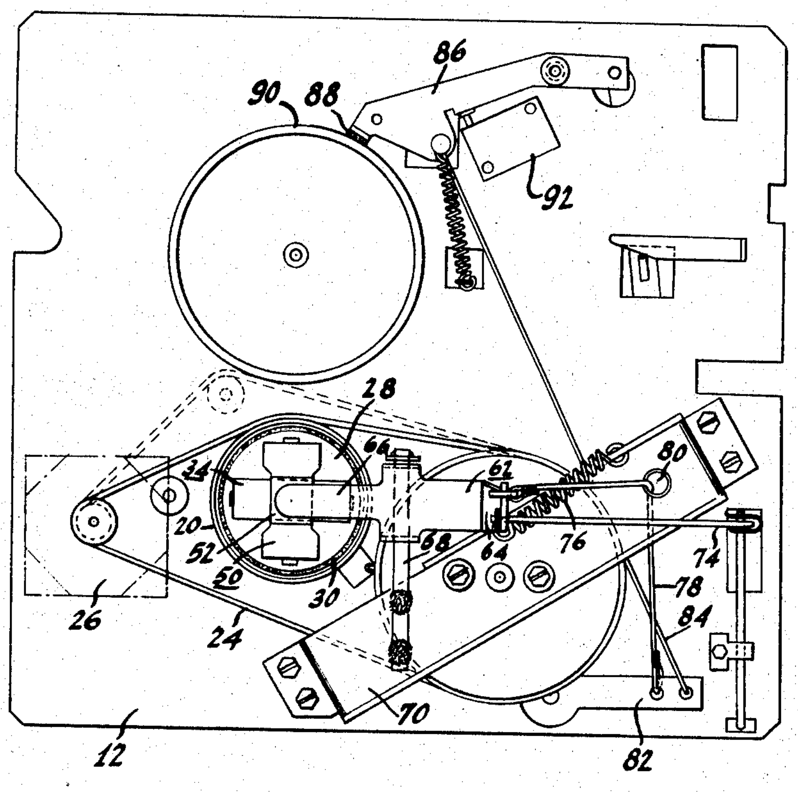
FIGURE 1 is a bottom plan view of a portion of a tape transport embodying the invention.
Figure 2:
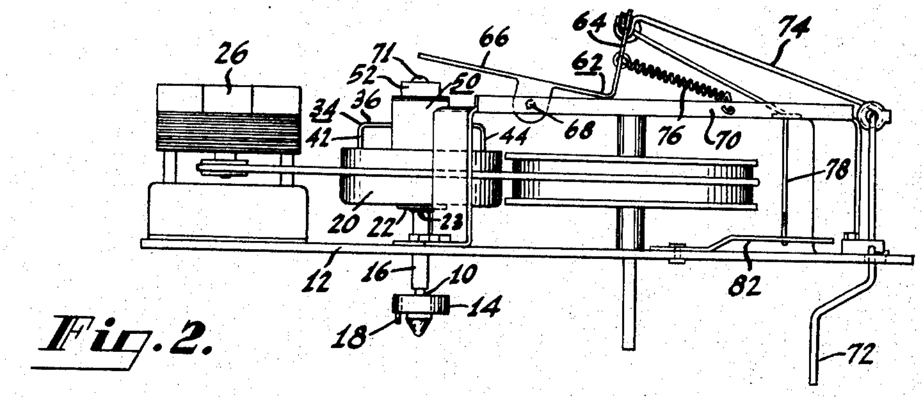
FIGURE 2 is a front elevational view of the transport of FIGURE 1 and showing the fast forward mechanism of the transport in its off position.
Figure 3:
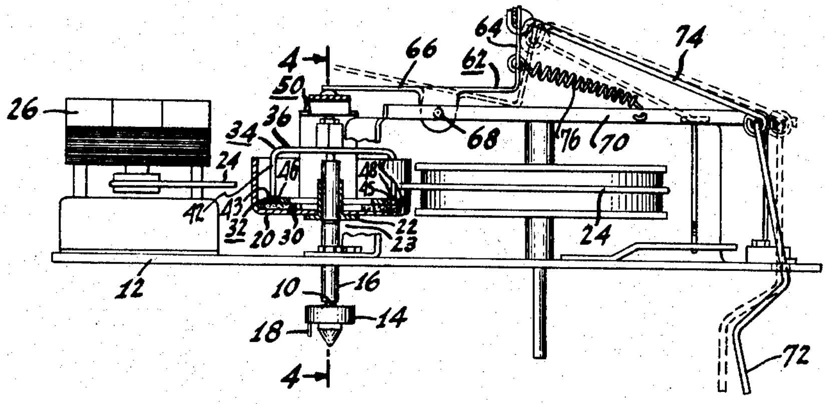
FIGURE 3 is a front elevational view of the transport of FIGURE 1 partially in section and showing the fast forward mechanism of the transport in its operating position.
Figure 4:
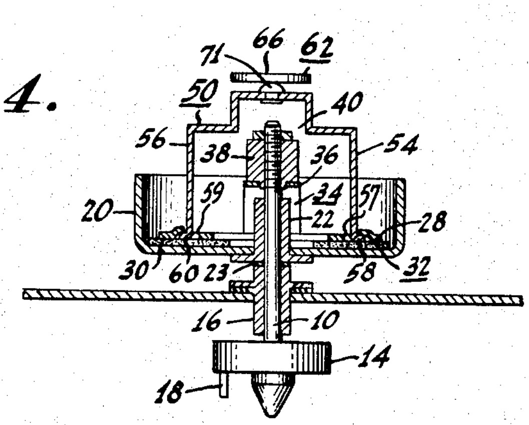
FIGURE 4 is a fragmentary sectional view of FIGURE 3 taken along the section line 4—4 and showing the clutch mechanism of the invention.
Figure 5:
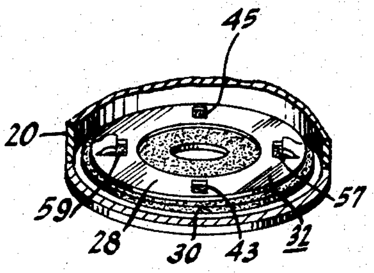
FIGURE 5 is a perspective view partially in section of the clutch plate and pulley forming part of the clutch mechanism of the invention.

In the drawings only those parts necessary for the understanding of the invention are shown. It is to be noted that FIGURE 1 is a "bottom" view of a transport embodying the invention and that FIGURES 2, 3 and 4 show the transport in its "inverted" or upside down position. However, reference to the structural relationship of the elements of the transport will be made while assuming the transport to be in its "normal" or right side up position.

Referring now to FIGURES 1 and 2, a drive mechanism associated with the take-up reel of a tape recording and playback apparatus (such as that shown and described in Tape Transport Service Data—File 1961, No. 15—TCT-3 and -3A, published by RCA Sales Corporation, 600 N. Sherman Drive, Indianapolis, Ind.) is shown in its stop or unenergized position. The drive mechanism includes a spindle 10 which projects upwardly through an opening in the base plate 12 of the tape transport. A turntable 14 for receiving the take-up reel (not shown) is secured to the upper end portion of the spindle 10 so as to be rotatable therewith. As shown in FIG. 4, the turntable 14 is spaced from the base plate 12 by means of a cylindrical bearing 16 concentric with the spindle and mounted in an opening in the base plate 12. Projecting from the top surface of the turntable 14 is a spring biased retractable pin 18. Pin 18 mates with a corresponding recess or hole in the body of the take-up reel to provide a positive connection between reel and turntable.

A driven cup-shaped wheel or clutch pulley 20 having a centrally spaced opening in its diametric surface is positioned on the underside of the base plate 12 coaxially with the depending lower portion of the spindle 10. The pulley 20 is fitted at its opening with a depending cylindrical bearing 22 which is freely rotatable about the spindle 10. A washer 23 is interposed between adjacent surfaces of bearings 16 and 22. The pulley 20 is rotated by a suitable driving mechanism in the transport apparatus, such as a belt 24 driven by a constant speed motor 26. The speed at which the pulley 20 is rotated is assumed to be sufficiently high to provide satisfactory high speed drive of a reel rotated in one-to-one ratio with the pulley.

A clutch assembly is provided for selectively positively coupling the spindle 10 and turntable 14 assembly to the pulley 20 for rotation therewith at a speed determined by the driving torque coupled from the pulley to the clutch assembly as will hereinafter be described.

A metal disc 28 having a layer 30 of a frictional material such as felt, cork or the like, affixed to one surface provides the clutch plate 32. As shown in FIG. 4, the plate 32 is mounted within the pulley 20 concentric with the spindle axis so that the frictional layer 30 is in cooperating relationship with the inside diametric surface area of the pulley 20. The plate 32 is frictionally coupled to the pulley 20 by the biasing action of a flat leaf spring member 34 formed into a U-shape. The spring has an opening in its bridge portion 36 for receiving the lower portion of the spindle 10. The lower end of the spindle 10 is threaded to receive a bushing 38. The upper portion of the bushing 38 is stepped and enters the opening in the spring 34 and is fastened thereto by means such as staking to fixedly couple the spring 34 to the spindle 10.

The spring 34 has opposed arms 42 and 44, the upper ends of which bear against the exposed metal surface of the clutch plate 32 to press the friction layer surface 30 against the inside diametric surface area of the pulley 20. Tips 46 and 48, extending up from the upper ends of the spring arms 42 and 44 respectively enter into holes 43 and 45 in the metal disc 28, to directly couple the clutch plate 32 to the spring 34 for rotation therewith. A lock nut 40 is then fastened to the lower end of the spindle 10 to secure a predetermined tension in the spring 34. The degree of friction coupling between the plate 32 and pulley 20 may be set by adjusting the position of the bushing 38 and lock nut 40 on the threaded portion of the spindle 10. When the bushing is moved along the spindle in a direction towards the spring, the spring force is increased, and this in turn increases the driving torque coupled from the pulley to the spindle and turntable assembly. The proper position of the bushing may be determined by trial so that a desired amount of slippage of the clutch plate may occur during normal record and playback reeling operation of the transport. Slippage of the clutch plate and turntable supported take-up reel is necessary to relieve excessive tension in the tape during record and playback operation, thereby minimizing the possibility of tape breakage.

To provide a means for a fast forward reeling operation of the transport, a second flat U-shaped leaf spring member 50 is positioned within the pulley 20 so that its bridge portion 52 overlays the bushing 38, lock nut 40 and spindle assembly and forms a "criss cross" pattern with the first spring 34. Second spring 50 has opposed arms 54 and 56 which bear against the metal surface of the clutch plate 32. Tips 58 and 60 extend out from the ends of the spring arms 54 and 56 respectively and enter holes 57 and 59 provided in the clutch plate to prevent rotation of the plate with respect to the second spring 50.

A manually controlled mechanism for selectively applying pressure to the second spring 50 to increase the driving torque on the take-up reel support assembly and provide a fast forward reeling operation in the transport comprises a flat L-shaped member 62 having a shoulder portion 64 and an arm portion 66. The L member 62 is pivotally secured intermediate its arm portion 66 to a shaft 68 fixedly mounted on a support bracket 70. The end of the arm portion 66 is adapted to engage a bearing surface 71 mounted in the bridge portion 52 of the second spring member 50. A fast forward operating lever 72 projects through an aperture in the base plate 12 and is coupled to the shoulder portion 64 of the L member 62 by means of a pivotally linked rod 74. As shown in FIG. 3, the lateral movement of the lever 72 with respect to the base plate 12 moves the L member 62 in a direction such that the end of its arm portion 66 engages the bearing surface 71 for the second spring member 50; thereby pressing arms 54 and 56 of the second spring member 50 against the metal disc 28 and increasing the drive torque coupled from the pulley 20 to the clutch plate 32 to produce a positive non-slippage or reduced slippage drive (depending on the displacement of the control lever 72) to the spindle 10 and support turntable 14. The L member 62 is biased by a spring 76 to return to its normal position upon release of the control lever 72. It will be understood that the spindle 10 and attached turntable 14 are permanently coupled to the first flat leaf spring 34, and since the spring 34 is directly coupled to the clutch plate 32, any increase in the drive torque coupled from the pulley 20 to the clutch plate 32 will be transmitted to the spindle 10 and turntable 14 in the form of increased reeling speed. It is important to note that during the operation of the transport in its fast forward reeling mode, the capstan and associated pressure roller should be disengaged from operative contact with the record tape.

In the subject transport mechanism, prior to utilizing the fast forward mode, the apparatus is placed in its stop or off position, whereupon the capstan and pressure roller are normally disengaged from the record tape. In accordance with another feature of the present invention, the movement of the L member may be coupled by means of a flexible member such as a string 78 (see FIG. 1) to a switch to energize the motor 26 which drives the clutch assembly and take-up spindle and reel support turntable. In the present example, the string 78 is looped through an eyeletted hole 80 in the support bracket 70 and pulls on a lever 82 which in turn is coupled by a rod 84 to a lever 86 which pivots to release the brake 88 restraining the drive pulley 90 associated with the tape supply spindle and turntable assembly (not shown). The pivotal movement of lever 86 also allows the contacts of a microswitch 92 to close to energize the take-up pulley drive motor 26.

From the foregoing description, it will be apparent that there has been provided a fast forward operation of a tape transport utilizing a variable torque clutch assembly to drive the take-up spindle and turntable. When a smoothly wound tape cartridge having a supply reel and a take-up reel is used, a low torque coupling to the take-up spindle is sufficient and it is not necessary to load the bearings coupling the clutch assembly to the take-up spindle and turntable to provide high speed reeling. On the other hand, when the tape winding on the cartridge reels are not smooth, i.e. uneven, a high torque coupling to the take-up reel is required for high speed forward reeling. The transport utilizing the present invention is constructed such that when the operator pulls on a lever 72, it first releases the brake 88 on the supply spindle drive pulley 90 and starts the motor 26, then increases the torque from that required to wind tape in normal play-record operation up to the limits of the drive system as the lever is pulled towards its maximum displacement or stop. This allows the operator to utilize only as much torque as is necessary to provide maximum fast-forward reeling between the supply and take-up reels in the cartridge, as well as a slow fast-forward reeling to locate particular passages on the tape. When the lever is released, it automatically returns to its normal off position, and its movement thereto causes the simultaneous deenergization of the motor 26 and the braking of the supply spindle drive pulley 90. This gives the fast-forward system a "fail safe" operation, i.e., the simultaneous deenergization of the motor and the braking of the supply spindle drive pulley upon the release of the level 72 to stop the fast-forward reeling operation minimizes the possibility of tape spillage due to the sudden stop.

I claim:

1. In a magnetic tape recorder of the type including a tape transport mechanism having a capstan for driving magnetic tape from a rotatable supply reel to a rotatable take-up reel and including a clutch means coupled between said take-up reel and a driving means, said clutch means being adjusted to provide a predetermined coupling between said driving means and said take-up reel to apply a first torque to said take-up reel during record and playback operations of said tape recorder, the improvement which comprises a fast forward mechanism including:

a manually operable member continuously movable from a first position to a limit position;

spring means cooperating with said clutch means; and means coupling said manually operable member to said spring means to apply a pressure thereto as a function of the movement of said manually operable member;

said spring means being adapted to continuously increase the torque applied from said driving means to said take-up reel from said first torque as a function of the pressure applied to said spring means by said coupling means as said manually operable member is moved from said first position to said limit position.

2. A reel driving slip clutch assembly for a magnetic tape transport comprising:

a take-up reel supporting spindle;

a driver clutch element disposed around said spindle and in a plane perpendicular to the axis of said spindle;

a driven friction clutch element rotatably mounted on said spindle in cooperative relation to said driver element;

first yielding means secured to said spindle and rotatable with said driven element to provide a predetermined amount of slippage between said driven element and said driver element; and second yielding means secured to said driven element and variably operable to provide a decrease in the amount of slippage between said driven and driver elements.

3. A reel driving slip clutch assembly for a magnetic tape transport comprising:

a take-up reel supporting spindle;

a driver clutch element disposed around said spindle and in a plane perpendicular to the axis of said spindle;

a driven friction clutch element rotatably mounted on said spindle in cooperative relation to said driver element;

first spring means secured to said spindle and rotatable with said driven element;

locking means on said spindle for biasing said spring means to provide a predetermined amount of slippage between said driven element and said driver element; and second spring means secured to said driven element and variably operable to provide a further decrease in the amount of slippage between said driven element and said driver element.

4. A reel driving slip clutch assembly for a magnetic tape transport comprising:

a take-up reel supporting spindle;

a driver clutch element disposed around said spindle and in a plane perpendicular to the axis of said spindle;

a driven friction clutch element rotatably mounted on said spindle in cooperative relation to said driver element;

first spring means secured to said spindle and rotatable with said driven element;

locking means on said spindle for biasing said spring means against said clutch element to provide a predetermined amount of slippage between said driven element and said driver element;

second spring means secured to and rotatable with said driven element; and control means operable to apply a variable force on said second spring for urging said driven element against said driver element, thereby to decrease the slippage between said driven element and said driver element and provide an increase in the rotatable coupling therebetween.

5. A variable torque clutch mechanism for driving the take-up spindle and reel support turntable of a tape transport comprising:

a cup-shaped clutch driver element having an annular end surface through which said take-up spindle projects;

a driven clutch plate disposed within said cup-shaped driver element adjacent the end surface and concentric with said spindle;

first spring means rotatable with said clutch plate and attached to said spindle for urging said clutch plate in direction to drivingly engage the end surface of said driven element with a predetermined amount of slippage therebetween; and second spring means rotatable with said clutch plate and variably operable to urge said clutch plate in a direction to drivingly engage the end surface of said driver element with a one-to-one coupling ratio.

6. A variable torque clutch mechanism for driving the take-up spindle and reel support turntable of a tape transport comprising:

a cup-shaped clutch driving pulley having an annular end surface through which said take-up spindle projects;

a driven clutch plate disposed within said pulley adjacent the end surface and concentric with said spindle;

first spring means rotatable with said clutch plate and attached to said spindle for urging said clutch plate against said pulley end surface to couple said spindle to said pulley with a preset amount of slippage between said clutch plate and pulley end surface; and second spring means adjacent said clutch plate and variably operable to urge said plate against said pulley end surface for coupling said spindle to said pulley without slippage of said clutch plate and pulley end surface.

7. A reel driving slip clutch assembly for a magnetic tape transport comprising:

a take-up reel supporting spindle;

a cup-shaped clutch driving pulley having an annular end surface through which said take-up spindle projects;

a driven clutch plate disposed within said pulley and concentric with said spindle, said plate having a layer of frictional material disposed adjacent to and for cooperation with the annular surface of said pulley;

first spring means rotatable with said clutch plate and attached to said spindle;

locking means on said spindle for biasing said spring means against said clutch plate to provide a predetermined amount of slippage between the plate friction layer and said pulley end surface;

second spring means secured to and rotatable with said clutch plate; and control means operable to apply a variable force on said second spring means for urging said clutch plate in a direction to decrease the slippage between said plate friction layer and pulley end surface and provide an increase in the rotatable coupling therebetween.

8. A reel driving slip clutch assembly according to claim 7 wherein said first spring means includes a flat U-shaped member, the open ends of which bear against said clutch plate with a force determined by the position of said locking means on said spindle.

9. A reel driving clutch assembly according to claim 8 wherein said second spring means includes a flat U-shaped member, the open ends of which bear against said clutch plate in response to the variable force coupled thereto from said control means.

10. A reel driving slip clutch assembly for a magnetic tape transporting comprising:

a take-up reel supporting spindle;

a driven pulley member having an annular cavity with a concentrically disposed portion defining an annular surface partially closing one end of said cavity and through which one end of said spindle projects;

a clutch plate rotatably mounted on said spindle and located within said pulley cavity, said clutch plate defining a friction surface spaced adjacent to and for cooperation with the annular surface of said pulley member;

first spring means fixedly mounted on said spindle and urging said clutch plate in a direction to drivingly engage the annular surface of said pulley member with a predetermined amount of slippage between the plate friction surface and said pulley member annular surface;

second spring means having portions disposed adjacent to and rotatable with said clutch plate; and variable control means operable with said second spring means to cause said spring means portions to press against said clutch plate in a direction to decrease the slippage between said plate friction surface and the annular surface of said pulley member whereby the driving engagement between said cooperating surfaces is transferred to said reel supporting spindle in a one-to-one ratio.

11. A reel driving slip clutch assembly for a magnetic tape transport comprising:

a take-up reel supporting spindle;

a driven pulley member having an annular cavity with a concentrically disposed portion defining an annular surface partially closing one end of said cavity and through which one end of said spindle projects;

a clutch plate rotatably mounted on said spindle and located within said pulley cavity, said clutch plate defining a friction surface spaced adjacent to and for cooperation with the annular surface of said pulley member;

means for mounting said first spring member on said spindle such that the open ends of said first spring member engage said clutch plate so as to be rotatable therewith and provide rotational coupling from said plate to said spindle, said means also causing said spring member ends to bear against said clutch plate with sufficient force to provide a predetermined amount of slippage between the clutch plate friction surface and the annular surface of said pulley member;

a second flat U-shaped spring member having a pair of opposed arm portions, the ends of which are disposed adjacent to and rotatable with said clutch plate; and means for applying a variable force to said second spring member to cause the ends of said opposed arm portions to press against said clutch plate in a direction to sufficiently decrease the slippage between said clutch plate friction surface and the annular surface of said pulley member and provide an increase in the rotatable coupling therebetween.

12. A clutch mechanism which comprises:

a spindle;

a cup-shaped pulley disposed around said spindle;

a clutch plate adjacent said pulley;

a first leaf type spring means secured between said spindle and said clutch plate for fixedly biasing said clutch plate in a direction towards said pulley;

a variable control means; and a second leaf type spring means secured to said clutch plate for variably biasing said clutch plate in a direction towards said pulley in response to said control means.

References Cited

UNITED STATES PATENTS

| | | | |
|---|---|---|---|
| 2,664,251 | 12/1953 | Berlane ---------- | 242—55.12 |
| 2,958,476 | 11/1960 | Montgomery et al. -- | 242—55.12 |

LEONARD D. CHRISTIAN, *Primary Examiner.*